United States Patent [19]
Burklin

[11] Patent Number: 5,848,028
[45] Date of Patent: Dec. 8, 1998

[54] METHOD AND APPARATUS FOR SYNCHRONIZING CLOCKS COUPLED TO NETWORK

[75] Inventor: Helmut Burklin, Strasbourg, France

[73] Assignee: Thomson Consumer Electronics, S.A., Courbevoie, France

[21] Appl. No.: 976,676

[22] Filed: Nov. 24, 1997

Related U.S. Application Data

[63] Continuation of Ser. No. 323,457, Oct. 14, 1994, abandoned.

[30] Foreign Application Priority Data

Oct. 21, 1993 [FR] France ................... 93402586

[51] Int. Cl.$^6$ .................................................. G04C 11/00
[52] U.S. Cl. ............................................. 368/46; 368/47
[58] Field of Search ................................... 368/41–47

[56] References Cited

U.S. PATENT DOCUMENTS

| | | | |
|---|---|---|---|
| 4,886,981 | 12/1989 | Lentini et al. | 368/46 |
| 5,334,975 | 8/1994 | Wachob et al. | 368/46 |
| 5,402,394 | 3/1995 | Turski | 368/46 |

FOREIGN PATENT DOCUMENTS

| | | |
|---|---|---|
| 0 548 381 | 3/1994 | European Pat. Off. . |
| 2 022 881 | 12/1979 | United Kingdom . |

*Primary Examiner*—Bernard Roskoski
*Attorney, Agent, or Firm*—Joseph S. Tripoli; Frederick A. Wein

[57] ABSTRACT

Many devices (in particular white goods or brown goods) in a household may contain a clock. Some systems allow connection of such devices and their related clocks to a common bus or network. The commands for controlling the clocks are in general limited to reading or writing a given time or to broadcasting the time of a given clock to one dedicated device or to the entire system or to a part of the system. In such known systems it is not specified in which manner a clock should react if it receives the time broadcast by another clock. It is possible to initialize all clocks to a given time, but due to tolerances in the different clocks, so achieved synchronization will not be maintained. Regular broadcasting by a special device master clock has the disadvantage of introducing one device with different capabilities. In case there are several master clocks, conflicts may occur and the advantages of a high precision clock will fade away if a lower precision master clock overrides it. In the present invention, only the clock with the highest precision broadcasts its time to the system, but whenever it fails the next lower precision clock takes over the broadcasting automatically. The broadcast periods are defined as factorial periods of a preselected time period. In an alternate embodiment, all devices broadcast the time with an equal period but with a different phase, and only if no broadcast was received in the preceding time period.

20 Claims, 1 Drawing Sheet

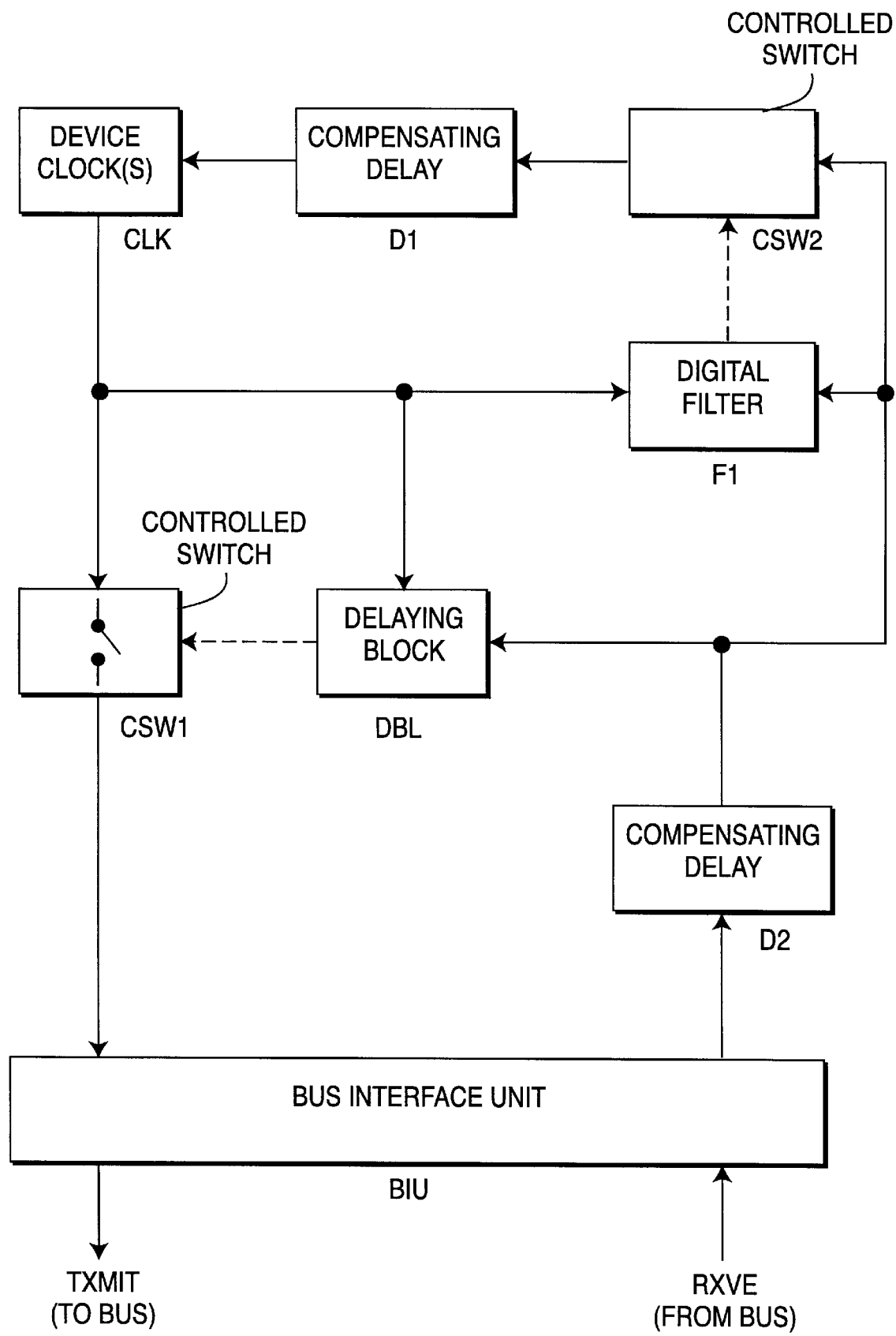

METHOD AND APPARATUS FOR SYNCHRONIZING CLOCKS COUPLED TO NETWORK

This application is a continuation of Ser. No. 08/323,457 filed Oct. 14, 1994, now abandoned.

FIELD OF THE INVENTION

The present invention relates to a method and to an apparatus for synchronizing clocks connected to a network system.

BACKGROUND OF THE INVENTION

Many household devices and appliances (particularly white goods and brown goods) contain clocks. Some systems allow these devices and appliances including their clocks—to be connected to a common bus or network. Operations of a device clock via the network might include synchronizing it to a time broadcast over the network, or broadcasting its time over the network in a so-designed system.

An example of a home bus system is described in Esprit Home Systems Specification 1.1 ESPRIT project 6782.

It may be possible in such systems to synchronize the various network clocks (e.g., by user action). However, synchronization will likely become lost due to variations in the time-keeping accuracies of the clocks. One solution to this problem has been to periodically broadcast times from one or more special device master clocks over the network, to which all network clocks synchronize. Where several master clocks are connected to the network, conflicts between master clocks may allow a lower precision clock to overrride a higher precision clock, thereby causing system clocks to be less accurate than is possible. Further, synchronization problems may arise if a master clock or clocks become disabled.

SUMMARY OF THE INVENTION

It is one object of the invention to provide a method and apparatus for synchronizing clocks of a plurality of devices connected to a network.

It is a further object of the present invention to provide a system capable of meeting the above object while utilizing at least the following clock types or conditions:

non initialized display only, no timer included battery driven low precision

50 Hz driven quartz driven official time distributed via radio for a specific time zone)

user intervention

This list can be interpreted as a list of priorities (from lowest to highest), user intervention having the highest. Higher priority clocks should set the time of lower priority clocks (in case there are tuners in the system which receive the time from different time zones, it is supposed that only the tie of one time zone will be transmitted to the rest of the system).

The first proposal for solving the problem involves the following:

every clock broadcasts (datagram distribution) its time periodically during a predefined broadcast period as determined by an associated broadcast period counter;

the broadcast period of a clock is dependent on its relative precision (higher precision leads to a shorter period);

every clock which receives a broadcast updates its time;

every clock which receives a broadcast resets its broadcast period counter; and user intervention initiates an immediate broadcast.

In this manner only the clock with the highest precision broadcasts its time to the system. Whenever it fails the next lower precision clock takes over the broadcasting function automatically. The broadcast periods are defined as factorial periods (e.g., 5, 6, 12, 15, 20, 30, and 60 seconds) of a preselected time period (e.g., one minute), and are synchronized to the preselected time unit. Then, all clocks displaying hours (hh) and minutes (mm) only will receive their time with no extra cost.

Another proposal is, that all devices will broadcast the time with an equal period (say one minute), but with a different phase (in seconds, e.g. highest precision clock at hh:mm:50, next lower precision clock at hh:mm:52, etc.; or highest precision clock at hh:mm:00, next lower precision clock at hh:mm:02, etc.) but only if no broadcast was received in the preceding time period. In the latter case, traffic on the network is independent of the precision of the different clocks. The displays are either slightly out of time or will need internal second counting capability.

In both proposals, time broadcasting may be done to the entire system or to a group, or subgroup, of clocks only.

A disadvantage of the both above described kinds of synchronizing is that the risk of collisions between two devices of equal precision is enhanced (causing higher traffic on the network), at least on media without collision avoidance (e.g. current carrier transmission on power lines), or if repetition is handled in the lower protocol layers only.

According to the invention, there are two proposals, said proposals involving:

Phase of transmission depends on precision every clock receiving a time broadcast of the same or higher precision class does not broadcast for a certain amount of time (e.g. N minutes). The precision class of the broadcast can be easily derived from the phase of the time broadcast (e.g. seconds count).

this amount of time (e.g. N minutes) is a random or pseudo-random value, depending on some internal state of the instance of this device (and only the present time). Two possibilities: these values may be changed periodically or after each transmission.

Frequency of transmission depends on precision every clock receiving a time broadcast of any precision class does not broadcast for a certain amount of time (e.g. N minutes).

this amount of time (e.g. N minutes) is a random or pseudo-random value, it depends a.o. on the precision of this clock, so that higher precision clocks will wait (in average) for a shorter time.

In principal, the inventive method is suited for synchronizing clocks being connected to a network system, whereby:

said clocks may belong to different precision classes;

the time of every clock is broadcast within said network system after expiry of a pre-selected time period, whereby a higher of said precision classes is associated with a shorter time periods and time period counting means are related to each of said clocks;

every clock which receives said broadcast updates its time and the related time period counting means are reset, or whereby:

said clocks may belong to different precision classes;

the time of every clock is broadcast within said network system having a pre-selected phase, which is related to said precision class in such a way that the broadcast time related to a higher of said precision classes is earlier, and having a preselected broadcast time period, which is independent of said precision class;

time of a specific clock is broadcast only, when the clock has received no related time from a clock belonging to a higher precision class;

every clock which receives said broadcast updates its time.

In principle the inventive apparatus for synchronizing clocks being connected to a network system includes:

a clock belonging to one of a plurality of predefined classes;

bus interface means which broadcast the time of said clock within said network system after expiry of a pre-selected time period, which is related to said precision class in such a way that a higher of said precision classes is associated with a shorter time period, whereby time period counting means are related to said clock, interrupt means which interrupt time transmission from said clock to said bus interface means during a certain time period after each reception of time information by said bus interface means, whereby the time of said clock is broadcast only, when the bus interface means have received no related time from a clock belonging to a higher precision class and whereby the time of said clock is updated when receiving said broadcast time information and said time period counting means are reset. Alternatively, the apparatus includes:

a clock belonging to one of a plurality of predefined to different precision classes;

bus interface means which broadcast the time of said clock within said network system having a pre-selected phase, which is related to said precision class in such a way that the broadcast time related to a higher of said precision classes is earlier, and having a pre-selected broadcast time period, which is independent of said precision class;

interrupt means which interrupt time transmission from said clock to said bus interface means during a certain time period after each reception of time information by said bus interface means, whereby the time of said clock is broadcast only, when the bus interface means have received no related time from a clock belonging to a higher precision class and whereby the time of said clock is updated when receiving said broadcast time information.

BRIEF DESCRIPTION OF THE DRAWING

FIG. 1, the sole drawing figure, is a block diagram of a portion of a network employing the present inventive clock synchronizing scheme, which is necessary for network interface with one device clock.

DESCRIPTION OF THE PREFERRED EMBODIMENTS

In a real system there is some delay in datagram distribution (routers, time for medium access). This delay may vary considerably over the time. For this reason every clock should rest its internal time only in case of major and/or repeated differences to the time received. The frequency of clock resets is a matter of design choice. Nevertheless the choice should be made keeping in mind the time difference between broadcasts of different precision classes, so that it is guaranteed that every clock will be overwritten, at least on the long term, by broadcasts of higher precision classes.

The distribution of time in the described manner is not limited to the time to day. For example, the date may be distributed with the time in every time period, or could be distributed only on longer periods, but only by the device which is currently broadcasting its time.

Referring to FIG. 1, an internal device clock CLK continuously distributes the local time inside a device (coffee machine, cooker, dishwasher, washing machine, heating system, air conditioner, FM receiver, TV set, VCR). A bus interface unit BIU receives time information RXVE from a bus (not shown). Time information TXMIT is sent to the bus only when the controlled switch CSW1 is closed. This switch is controlled by a delaying block DBL which interrupts time transmission during a certain time period after each reception of time information (i.e., at the expiration of the time period corresponding to the precision class to which the clock has been pre-assigned). As a matter of design choice, transmission from the clock can be limited to fixed internal time intervals.

Incoming time information RXVE is allowed to set the internal clock CLK only when a second controlled switch CSW2 is closed. This switch may be closed continuously in a simple embodiment. In an alternate embodiment, the switch CSW2 can be controlled by a digital filter circuit F1 which compares the internal time of the clock CLK to the received time, and allows updating only when a significant difference over a certain period is detected. Supplementary blocks D1, D2 for compensating the delay of time distribution within the network may be included.

Advantageously, in a bus system with more than one real time clock initial synchronization will be achieved without user intervention (if at least one of the clocks is initialized). Synchronization will be kept, while highest precision clocks take priority over lower precision ones. Even if the controlling clock fails, the next lower priority clock will automatically take over the task of controlling the system. Updating is still possible by manual intervention from any point of the system. Bus traffic is kept low.

I claim:

1. Apparatus for synchronizing clocks within a network system, said apparatus being connectable to the network system, comprising:

a plurality of clocks connected to a network;

at least one clock having one out of a plurality of different precision classes, ranging from a first high precision class to a last low precision class, wherein each said precision class is associated with a particular broadcast time period, and wherein a particular said broadcast time period of shorter duration than another said broadcast time period is associated with a correspondingly higher said precision class than said precision class associated with said another broadcast time period;

time period counting means;

bus interface means coupled to said clock for receiving a time transfer of said clock time and broadcasting the time of said clock to all other clocks within said network after expiration of the broadcast time period associate with said clock, and also for receiving the time of another clock within said network system;

interrupt means for interrupting the time transfer from said clock to said bus interface means for a certain waiting time period after each reception of time information by said bus interface means; wherein the time of said clock is broadcast only when the bus interface means have not received time information from said another clock within said network system;

updating means for updating the time of said clock when receiving said time of another clock within said network system; and resetting means for resetting said time period counting means when receiving said time of another clock within said network system.

2. Apparatus according to claim 1, further comprising digital filter means for comparing the internal time of said clock and the time broadcast within said network; whereby updating of the clock time occurs only when a different exceeding a pre-selected threshold over a pre-selected observation period is detected.

3. Apparatus for synchronizing clocks within a network system, said apparatus being connectable to the network system, comprising:

a plurality of clocks connected to a network;

at least one clock having one out of a plurality of different precision classes ranging from a first high precision class to a last low precision class, said clock having a broadcast time period independent of said precision class and a broadcast time associated with said clock precision class, wherein a particular said broadcast time temporally precedes another said broadcast time when said clock precision class is correspondingly higher than said another clock precision class;

time period counting means;

bus interface means coupled to said clock for receiving a time transfer from said clock and broadcasting the time of said clock to all other clocks within said network, and for receiving the time of another clock within said network system;

interrupt means for interrupting the time transfer from said clock to said bus interface means for a certain listening time period after each reception of time information by said bus interface means; wherein the time of said clock is broadcast only when the bus interface means have not received time information from said another clock within said network system; and updating means for updating the time of said clock when receiving said time of said another clock within the network system.

4. Apparatus according to claim 3, further comprising digital filter means for comparing the internal time of said respective clock and the time broadcast within said network; whereby updating of the respective clock time occurs only when a difference exceeding a pre-selected threshold over a pre-selected observation period is detected.

5. A clock synchronizing method for synchronizing a plurality of clocks coupled to a network, comprising the steps of:

assigning a predetermined broadcast time period corresponding to a precision class indicative of a precision to each respective clock, wherein the broadcast time period is inversely related to the precision of the corresponding precision class, the magnitude of said broadcast time period being representable by a count within the range of a broadcast time period counter;

for each of said clocks during the associated broadcast time period, whenever a time value is broadcast over said network, setting the time kept by each said respective clock to that broadcast time value;

resetting and restarting the broadcast time period each time the associated clock receives a broadcast time value and after expiration of the broadcast time period; and for each of said clocks, broadcasting a time value corresponding to the current time of said clock over said network at the expiration of the associated broadcast time period.

6. Method according to claim 5, wherein every clock receiving a time broadcast of any precision class does not broadcast its time within a further time period which is higher than said pre-selected time period.

7. Method according to claim 5, wherein said further time period is one of a random and pseudo-random value, depending on some internal state of a device to which the clock belongs and depending not only on the present time, whereby these values are changed periodically or after each time broadcast.

8. Method according to claim 5, wherein said time is broadcast only to a part of the clocks belonging to said network.

9. Method according to claim 5, wherein said pre-selected time period is a factorial period of a minute.

10. Method according to claim 5, wherein tuners related to said clocks receive the time of different time zones, one of said zone times is selected for broadcasting within said network.

11. Method according to claim 5, wherein when evaluating the internal time of a clock and the time broadcast within said network, the delay of time distribution within said network is compensated.

12. Method according to claim 5, wherein digital filter means compare the internal time of a clock and the time broadcast within said network and allow updating only when a different exceeding a pre-selected threshold over a pre-selected observation period is detected.

13. A clock synchronization method for synchronizing a plurality of clocks coupled to a network, comprising the steps of:

assigning one of a plurality of precision classes to each respective clock, said precision classes being based upon the degree of time-keeping precision of the assigned clocks;

for each of said clocks, broadcasting a signal representing a time value corresponding to the current time of the respective clock when triggered;

for each of said clocks, listening for time values broadcast over said network by other clocks;

varying at least one characteristic of the signal representing the broadcast time values to identify the precision class of said broadcast time value; and each of said clocks being triggered to broadcast a time value whenever a broadcast time value belonging to a precision class representing greater precision than that of said respective clock does not occur during a pre-selected listening period.

14. Method according to claim 13 wherein every clock receiving a time broadcast of the same or higher precision class does not broadcast its time within a further time period which is higher than said pre-selected time period.

15. Method according to claim 13, wherein said further time period is one of a random and pseudo-random value, dependent upon the internal state of a device to which the clock belongs and depending not only on the present time, whereby these values are changed periodically or after each time broadcast.

16. Method according to claim 13, wherein said time is broadcast only to a part of the clocks belong to said network.

17. Method according to claim 13, wherein said pre-selected time period is a factorial period of a minute.

18. Method according to claim 13, wherein tuners related to said clocks receive the time of different time zones, one of said zone times being selected for broadcasting within said network.

19. Method according to claim 13, wherein when evaluating the internal time of a clock and the time broadcast within said network, delay of time distribution within said network is compensated for.

20. Method according to claim 13, wherein digital filter means compare the internal time of a clock and the time broadcast within said network and allow updating only when a difference exceeding a pre-selected threshold over a pre-selected observation period is detected.

\* \* \* \* \*